United States Patent
Xia et al.

(10) Patent No.: US 11,039,459 B2
(45) Date of Patent: Jun. 15, 2021

(54) DATA TRANSMISSION METHOD AND APPARATUS, AND ELECTRONIC DEVICE

(71) Applicant: ZTE CORPORATION, Shenzhen (CN)

(72) Inventors: Shuqiang Xia, Shenzhen (CN); Chunli Liang, Shenzhen (CN); Jing Shi, Shenzhen (CN); Xianghui Han, Shenzhen (CN); Wen Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 89 days.

(21) Appl. No.: 16/347,505

(22) PCT Filed: Oct. 30, 2017

(86) PCT No.: PCT/CN2017/108389
§ 371 (c)(1),
(2) Date: May 3, 2019

(87) PCT Pub. No.: WO2018/082525
PCT Pub. Date: May 11, 2018

(65) Prior Publication Data
US 2020/0187225 A1 Jun. 11, 2020

(30) Foreign Application Priority Data
Nov. 3, 2016 (CN) .......................... 201610958372.4

(51) Int. Cl.
*H04W 72/12* (2009.01)
*H04L 5/00* (2006.01)

(52) U.S. Cl.
CPC ....... *H04W 72/1242* (2013.01); *H04L 5/0083* (2013.01); *H04W 72/1289* (2013.01)

(58) Field of Classification Search
CPC .......... H04W 72/1242; H04W 72/1289; H04L 5/0083
See application file for complete search history.

(56) References Cited

U.S. PATENT DOCUMENTS

| | | | |
|---|---|---|---|
| 8,897,253 B2 | 11/2014 | Shin et al. | |
| 9,473,279 B2 | 10/2016 | Blankenship et al. | |
| 2013/0114517 A1 | 5/2013 | Blankenship et al. | |
| 2013/0176952 A1 | 7/2013 | Shin et al. | |
| 2013/0294367 A1* | 11/2013 | Jalloul | H04W 72/082 370/329 |

(Continued)

FOREIGN PATENT DOCUMENTS

| | | |
|---|---|---|
| CN | 103068051 A | 4/2013 |
| CN | 103733560 A | 4/2014 |

(Continued)

OTHER PUBLICATIONS

Partial Supplementary European Search Report of corresponding European Application No. 17867089.9—13 pages (dated May 25, 2020).

(Continued)

*Primary Examiner* — Michael J Moore, Jr.
(74) *Attorney, Agent, or Firm* — Knobbe, Martens, Olson & Bear, LLP

(57) ABSTRACT

Disclosed is a data transmission method and apparatus, and an electronic device. The method includes that a transmitting end transmits data over an allocated resource. The allocated resource includes one of: a first type of resource and a second type of resource; or the second type of resource. A starting time of the second type of resource is later than a starting time of the first type of resource, or an ending time of the second type of resource is earlier than an ending time of the first type of resource. The data transmitted over the first type of resource and the date transmitted over the second type of resource are aligned on a time-domain symbol.

18 Claims, 8 Drawing Sheets

(56) References Cited

U.S. PATENT DOCUMENTS

| | | | |
|---|---|---|---|
| 2015/0036645 A1 | 2/2015 | Shin et al. | |
| 2017/0318478 A1 | 11/2017 | Mallick et al. | |
| 2018/0035332 A1* | 2/2018 | Agiwal | H04W 74/0858 |
| 2018/0042030 A1* | 2/2018 | Xu | H04W 28/0215 |
| 2018/0070341 A1* | 3/2018 | Islam | H04L 1/1887 |
| 2018/0083758 A1* | 3/2018 | Islam | H04L 27/2602 |
| 2018/0103428 A1* | 4/2018 | Jiang | H04W 72/042 |
| 2018/0115964 A1* | 4/2018 | Lin | H04W 72/1242 |
| 2019/0253099 A1* | 8/2019 | Tanaka | H04L 5/0016 |
| 2019/0254058 A1* | 8/2019 | Xie | H04L 5/0064 |
| 2019/0268930 A1* | 8/2019 | Rudolf | H04L 5/0094 |
| 2019/0280802 A1* | 9/2019 | Ma | H04W 76/11 |
| 2020/0015098 A1 | 1/2020 | Mallick et al. | |
| 2020/0186313 A1* | 6/2020 | Wong | H04L 1/0025 |

FOREIGN PATENT DOCUMENTS

| | | |
|---|---|---|
| CN | 104054359 A | 9/2014 |
| CN | 105979597 A | 9/2016 |
| EP | 3082366 A1 | 10/2016 |

OTHER PUBLICATIONS

Interdigital Communications, "Scheduling and Support for Service Multiplexing", R1-1610090, 3GPP TSG-RAN WG1 Meeting #86bis, Oct. 14, 2016, section 3.

Samsung, "Numerology for URLLC", R1-1609050, 3GPP TSG RAN WG1 Meeting #86bis, Oct. 14, 2016, section 2.2 and figure 4b.

ZTE et al., "Multiplexing of eMBB and URLLC", R1-166408, 3GPP TSG RAN WG1 Meeting #86, Aug. 26, 2016, sections 2.2.3 and 2.3.

International Search Report dated Jan. 26, 2018 for International Application No. PCT/CN2017/108389, 7 pages.

Written Opinion of the International Searching Authority dated Jan. 26, 2018 for International Application No. PCT/CN2017/108389, 3 pages.

* cited by examiner

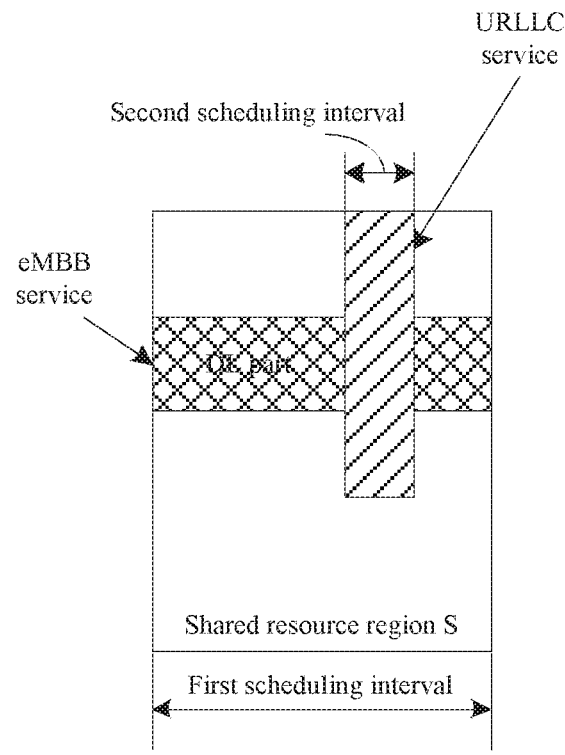

FIG. 1

A transmitting end transmits data over an allocated resource, where the allocated resource includes one of: a first type of resource and a second type of resource; or the second type of resource, where a starting time of the second type of resource is later than a starting time of the first type of resource, or an ending time of the second type of resource is earlier than an ending time of the first type of resource, and the data transmitted over the first type of resource and the date transmitted over the second type of resource are aligned on a time-domain symbol

201

FIG. 2 a first type of resource and a second type of resource, or the second type of resource; where a starting time of the second type of resource is later than a starting time of the first type of resource, or an ending time of the second type of resource is earlier than an ending time of the first type of resource, and the data transmitted over the first type of resource and the date transmitted over the second type of resource are aligned on a time-domain symbol.

DATA TRANSMISSION METHOD AND APPARATUS, AND ELECTRONIC DEVICE

CROSS-REFERENCE TO RELATED APPLICATIONS

This is a National Phase Application, filed under 35 U.S.C. 371, of International Patent Application No. PCT/CN2017/108389, filed on Oct. 30, 2017, which claims priority to Chinese patent application No. 2016/10958372.4 filed on Nov. 3, 2016, contents of each of which are incorporated herein by reference in their entireties.

TECHNICAL FIELD

The present disclosure relates to the field of New Radio (NR) mobile communication networks and, in particular, to a data transmission method and apparatus, and an electronic device in a case where the Enhanced Mobile Broadband (eMBB) service and the Ultra Reliability Low Latency Communication (URLLC) service coexist under NR.

BACKGROUND

The 3rd Generation Partnership Project (3GPP) NR demand report clarifies that the NR network is required to support URLLC service. The URLLC service has two performance indicators: user-plane average delay and reliability. As regards user-plane delay, the average delay is 0.5 ms in both the uplink and the downlink. As regards reliability, a data packet with a given size requires 99.999% reliable transmission within 1 ms under certain channel conditions. This will require a shorter scheduling interval for the URLLC service. For example, 125 µs is used as the length of one slot, or the length of an Orthogonal Frequency Division Multiplexing (OFDM) symbol having a normal cyclic prefix (CP) and having a subcarrier interval of 15 kHz between two subcarriers is used as the length of one slot. Here the slot is used as one scheduling unit, and the length of the slot is the scheduling interval. To be distinguished from the scheduling interval of the eMBB service described below, the scheduling interval of the URLLC service is referred to as a second scheduling interval, and URLLC service data is referred to as a second type of data.

For the eMBB service in the NR, the delay requirement is less strict than the delay requirement of the URLLC service, and the average delay is 4 ms in both the uplink and the downlink; therefore, a base station may schedule eMBB service data by using a longer scheduling interval, thereby reducing control channel overheads brought by frequent scheduling. For example, 0.5 ms or 1 ms is used as one scheduling interval. The scheduling interval of the eMBB service is referred to as a first scheduling interval, and eMBB service data is referred to as a first type of data.

SUMMARY

The following is the summary of the subject matter described herein in detail. This summary is not intended to limit the scope of the claims.

Embodiments of the present disclosure provide a data transmission method and apparatus, and an electronic device.

A data transmission method includes:
transmitting, by a transmitting end, data over an allocated resource, where the allocated resource includes one of: a first type of resource and a second type of resource, When the allocated resource includes the first type of resource and the second type of resource, the data is a first type of data; and when the allocated resource is the second type of resource, the data is a second type of data; where the first type of data and the second type of data have different key performance indicator (KPI) requirements.

The method further includes:
transmitting, by the transmitting end, a first redundancy version of the first type of data over the allocated first type of resource; and transmitting, by the transmitting end, a second redundancy version of the first type of data over the allocated second type of resource, where the first redundancy version is different from the second redundancy version.

A version number of the first redundancy version is equal to 0 when the first type of data is transmitted for a first time.

Downlink control information (DCI) for scheduling the first type of data is located in at least the first type of resource; and DCI for scheduling the second type of data is located in the second type of resource.

The transmitting end transmits the first type of data over the first type of resource and the second type of resource by using a same transmission mode.

The transmitting end transmits the first type of data over the first type of resource and the second type of resource by using a same modulation and coding scheme (MCS) or different MCSs.

When the transmitting end transmits the first type of data over the first type of resource and the second type of resource by using different MCSs, an MCS index used for the second type of resource is lower than an MCS index used for the first type of resource.

When the transmitting end transmits the first type of data over the first type of resource and the second type of resource by using different MCSs, an MCS used for the first type of resource and an MCS used for the second type of resource are indicated by two different control fields in DCI for scheduling the first type of data, or the MCS used for the first type of resource is indicated by a control field in the DCI for scheduling the first type of data, and the MCS used for the second type of resource has a preset offset from the MCS used for the first type of resource.

A demodulation reference signal corresponding to the first type of data transmitted over the first type of resource is located on the first type of resource, and a time-domain symbol index of a demodulation reference signal corresponding to the first type of data transmitted over the second type of resource is the same as a time-domain symbol index of the demodulation reference signal transmitted over the first type of resource.

A relative frequency-domain position of the demodulation reference signal corresponding to the first type of data transmitted over the second type of resource is the same as a relative frequency-domain position of the demodulation reference signal transmitted over the first type of resource.

A demodulation reference signal corresponding to the second type of data is located on the second type of resource.

When the transmitting end transmits the second type of data over the second type of resource, assume-to-be-transmitted data of a demodulation reference signal of M antenna ports is transmitted at a same position as the first type of data transmitted over the second type of resource, where M is a positive integer.

M is pre-agreed by the transmitting end and a receiving end, notified by a high-layer signaling or indicated by a control field in the DCI for scheduling the second type of data.

The second type of resource includes a second type of resource A and a second type of resource B.

A first time-domain symbol of the second type of resource A is aligned with a first time-domain symbol of the first type of resource, and an ending time of the second type of resource A is earlier than an ending time of the first type of resource; and an ending time of the second type of resource B is the same as the ending time of the first type of resource.

The second type of resource A is a subset of the second type of resource B; or the second type of resource A is orthogonal to the second type of resource B in a time domain.

The number of time-domain symbols occupied by the second type of resource A is pre-agreed by the transmitting end and a receiving end or notified by a high-layer signaling; and when the number of time-domain symbols occupied by the second type of resource A is pre-agreed, the number of time-domain symbols occupied by the second type of resource A is the same as the number of time-domain symbols corresponding to an scheduling interval of the second type of data.

The transmitting end indicates, by using an allocation signaling for the second type of resource, a current resource type of the first type of data transmitted over the second type of resource, and the allocation signaling for the second type of resource is one control field in DCI for scheduling the first type of data.

When the second type of resource A is a subset of the second type of resource B, the allocation signaling for the second type of resource has a size of one bit, where a first state of the allocation signaling for the second type of resource indicates that current data is transmitted over the second type of resource A, and a second state of the allocation signaling for the second type of resource indicates that the current data is transmitted over the second type of resource B.

When the second type of resource A is orthogonal to the second type of resource B in the time domain, the allocation signaling for the second type of resource has a size of two bits, where a first state of the allocation signaling for the second type of resource indicates that the first type of data is transmitted over the second type of resource A, a second state of the allocation signaling for the second type of resource indicates that the first type of data is transmitted over the second type of resource B, and a third state of the allocation signaling for the second type of resource indicates that the first type of data is transmitted over the second type of resource A and the second type of resource B.

Distribution of the first type of resource and the second type of resource in a system bandwidth is predefined by the transmitting end and a receiving end or configured by a high-layer signaling.

A frequency-domain bandwidth for the first type of data is different from a frequency-domain bandwidth for the second type of data in the second type of resource.

A data transmission method includes:
 detecting, by a receiving end, a downlink control channel and acquiring, by the receiving end, DCI related to transmission;
 determining a resource type of to-be-received data according to a resource allocation control field in the DCI; and
 detecting the to-be-received data according to the DCI and the resource type of the to-be-received data.

The resource type includes a first type of resource and a second type of resource.

Distribution of the first type of resource and the second type of resource in a system bandwidth is predefined by the transmitting end and a receiving end or configured by a high-layer signaling.

The second type of resource includes a second type of resource A and a second type of resource B.

A first time-domain symbol of the second type of resource A is aligned with a first time-domain symbol of the first type of resource, and an ending time of the second type of resource A is earlier than an ending time of the first type of resource; and an ending time of the second type of resource B is the same as the ending time of the first type of resource.

The second type of resource A is a subset of the second type of resource B; or the second type of resource A is orthogonal to the second type of resource B in a time domain.

The receiving end includes a receiving end for receiving the first type of data and a receiving end for receiving the second type of data, and the first type of data and the second type of data have different key performance indicator (KPI) requirements.

When the receiving end is a receiving end for receiving the first type of data, the receiving end determines, according to the resource allocation control field in the DCI, that the resource type of the to-be-received data includes one of: the first type of resource; or the first type of resource and the second type of resource.

When the receiving end determines that the resource type of the received data includes the first type of resource and the second type of resource, a terminal determines usage of the second type of resource according to a resource allocation control field for the second type of resource in the DCI.

When the receiving end determines that the resource type of the to-be-received data includes the first type of resource and the second type of resource, the receiving end performs detection according to different redundancy versions of the to-be-received data carried on the first type of resource and the second type of resource.

When the receiving end is the receiving end for receiving the second type of data, the receiving end receives over only the second type of resource.

The method further includes:
 when T2−T1>T, deciding, by a receiving end for receiving the second type of data, not to provide feedback for hybrid automatic repeat request-acknowledgement (HARQ-ACK) of retransmitted data, where T1 is a first time at which the second type of data is received, T2 is another time at which the second type of data is received, and T is a parameter pre-agreed by a transmitting end and the receiving end or notified by a high-layer signaling.

When the receiving end for receiving the second type of data receives data over the second type of resource, assume-to-be-received data of a demodulation reference signal of M antenna ports is transmitted at a same position as the first type of data transmitted over the second type of resource, where M is a positive integer.

M is pre-agreed by the transmitting end and a receiving end, notified by a high-layer signaling or indicated by a control field in the DCI for scheduling the second type of data.

A data transmission apparatus, applied to a transmitting end, includes a transmitting unit.

The transmitting unit is configured to transmit data over an allocated resource. The allocated resource includes one of: a first type of resource and a second type of resource; or the second type of resource. A starting time of the second type of resource is later than a starting time of the first type of resource or an ending time of the second type of resource is earlier than an ending time of the first type of resource, and the data transmitted over the first type of resource and the data transmitted over the second type of resource are aligned on a time-domain symbol.

When the allocated resource includes the first type of resource and the second type of resource, the data is a first type of data; and when the allocated resource is the second type of resource, the data is a second type of data; where the first type of data and the second type of data have different key performance indicator (KPI) requirements.

The transmitting unit is further configured to transmit a first redundancy version of the first type of data over the allocated first type of resource; and to transmit a second redundancy version of the first type of data over the allocated second type of resource. The first redundancy version is different from the second redundancy version.

A version number of the first redundancy version is equal to 0 when the first type of data is transmitted for a first time.

Downlink control information (DCI) for scheduling the first type of data is located in at least the first type of resource; and DCI for scheduling the second type of data is located in the second type of resource.

The transmitting end transmits the first type of data over the first type of resource and the second type of resource by using a same transmission mode.

The transmitting end transmits the first type of data over the first type of resource and the second type of resource by using a same modulation and coding scheme (MCS) or different MCSs.

When the transmitting end transmits the first type of data over the first type of resource and the second type of resource by using different MCSs, an MCS index used for the second type of resource is lower than an MCS index used for the first type of resource.

When the transmitting end transmits the first type of data over the first type of resource and the second type of resource by using different MCSs, an MCS used for the first type of resource and an MCS used for the second type of resource are indicated by two different control fields in DCI for scheduling the first type of data, or the MCS used for the first type of resource is indicated by a control field in the DCI for scheduling the first type of data, and the MCS used for the second type of resource has a preset offset from the MCS used for the first type of resource.

A demodulation reference signal corresponding to the first type of data transmitted over the first type of resource is located on the first type of resource, and a time-domain symbol index of a demodulation reference signal corresponding to the first type of data transmitted over the second type of resource is the same as a time-domain symbol index of the demodulation reference signal transmitted over the first type of resource.

A relative frequency-domain position of the demodulation reference signal corresponding to the first type of data transmitted over the second type of resource is the same as a relative frequency-domain position of the demodulation reference signal transmitted over the first type of resource.

A demodulation reference signal corresponding to the second type of data is located on the second type of resource.

When the transmitting end transmits the second type of data over the second type of resource, assume-to-be-transmitted data of a demodulation reference signal of M antenna ports is transmitted at a same position as the first type of data transmitted over the second type of resource, where M is a positive integer.

M is pre-agreed by the transmitting end and a receiving end, notified by a high-layer signaling or indicated by a control field in the DCI for scheduling the second type of data.

The second type of resource includes a second type of resource A and a second type of resource B.

A first time-domain symbol of the second type of resource A is aligned with a first time-domain symbol of the first type of resource, and an ending time of the second type of resource A is earlier than an ending time of the first type of resource; and an ending time of the second type of resource B is the same as the ending time of the first type of resource.

The second type of resource A is a subset of the second type of resource B; or the second type of resource A is orthogonal to the second type of resource B in a time domain.

The number of time-domain symbols occupied by the second type of resource A is pre-agreed by the transmitting end and a receiving end or notified by a high-layer signaling; and when the number of time-domain symbols occupied by the second type of resource A is pre-agreed, the number of time-domain symbols occupied by the second type of resource A is the same as the number of time-domain symbols corresponding to an scheduling interval of the second type of data.

The transmitting end indicates, by using an allocation signaling for the second type of resource, a current resource type of the first type of data transmitted over the second type of resource, and the allocation signaling for the second type of resource is one control field in DCI for scheduling the first type of data.

When the second type of resource A is a subset of the second type of resource B, the allocation signaling for the second type of resource has a size of one bit, where a first state of the allocation signaling for the second type of resource indicates that current data is transmitted over the second type of resource A, and a second state of the allocation signaling for the second type of resource indicates that the current data is transmitted over the second type of resource B.

When the second type of resource A is orthogonal to the second type of resource B in the time domain, the allocation signaling for the second type of resource has a size of two bits, where a first state of the allocation signaling for the second type of resource indicates that the first type of data is transmitted over the second type of resource A, a second state of the allocation signaling for the second type of resource indicates that the first type of data is transmitted over the second type of resource B, and a third state of the allocation signaling for the second type of resource indicates that the first type of data is transmitted over the second type of resource A and the second type of resource B.

Distribution of the first type of resource and the second type of resource in a system bandwidth is predefined by the transmitting end and a receiving end or configured by a high-layer signaling.

A frequency-domain bandwidth for the first type of data is different from a frequency-domain bandwidth for the second type of data in the second type of resource.

A data transmission apparatus, applied to a receiving end, includes an acquisition unit, a determination unit and a detection unit.

An acquisition unit, which is configured to detect a downlink control channel and acquire downlink control information (DCI) related to transmission;

a determination unit, which is configured to determine a resource type of to-be-received data according to a resource allocation control field in the DCI; and a detection unit, which is configured to detect the to-be-received data according to the DCI and the resource type of the to-be-received data.

The resource type includes a first type of resource and a second type of resource.

Distribution of the first type of resource and the second type of resource in a system bandwidth is predefined by the transmitting end and a receiving end or configured by a high-layer signaling.

The second type of resource includes a second type of resource A and a second type of resource B.

A first time-domain symbol of the second type of resource A is aligned with a first time-domain symbol of the first type of resource, and an ending time of the second type of resource A is earlier than an ending time of the first type of resource; and an ending time of the second type of resource B is the same as the ending time of the first type of resource.

The second type of resource A is a subset of the second type of resource B; or the second type of resource A is orthogonal to the second type of resource B in a time domain.

The receiving end includes a receiving end for receiving the first type of data and a receiving end for receiving the second type of data, and the first type of data and the second type of data have different key performance indicator (KPI) requirements.

When the receiving end is a receiving end for receiving the first type of data, the receiving end determines, according to the resource allocation control field in the DCI, that the resource type of the to-be-received data includes one of: the first type of resource; or the first type of resource and the second type of resource.

When the receiving end determines that the resource type of the received data includes the first type of resource and the second type of resource, a terminal determines usage of the second type of resource according to a resource allocation control field for the second type of resource in the DCI.

When the receiving end determines that the resource type of the to-be-received data includes the first type of resource and the second type of resource, the receiving end performs detection according to different redundancy versions of the to-be-received data carried on the first type of resource and the second type of resource.

When the receiving end is the receiving end for receiving the second type of data, the receiving end receives over only the second type of resource.

When T2−T1>T, a receiving end for receiving the second type of data decides not to provide feedback for hybrid automatic repeat request-acknowledgement (HARQ-ACK) of retransmitted data, where T1 is a first time at which the second type of data is received, T2 is another time at which the second type of data is received, and T is a parameter pre-agreed by a transmitting end and the receiving end or notified by a high-layer signaling.

When the receiving end for receiving the second type of data receives data over the second type of resource, assume-to-be-received data of a demodulation reference signal of M antenna ports is transmitted at a same position as the first type of data transmitted over the second type of resource, where M is a positive integer.

M is pre-agreed by the transmitting end and a receiving end, notified by a high-layer signaling or indicated by a control field in the DCI for scheduling the second type of data.

An electronic device includes: a processor; and a memory storing instructions executable by the processor, where when the instructions are executed by the processor, the processor executes steps of the preceding method for indicating a direct current subcarrier.

Embodiments of the present disclosure further provide a computer-readable storage medium configured to store computer-executable instructions for executing any method described above when the instructions are executed by a processor.

In embodiments of the present disclosure, a transmitting end transmits data over an allocated resource. The allocated resource includes one of: a first type of resource and a second type of resource; or the second type of resource. A starting time of the second type of resource is later than a starting time of the first type of resource, or an ending time of the second type of resource is earlier than an ending time of the first type of resource, and the data transmitted over the first type of resource and the date transmitted over the second type of resource are aligned on a time-domain symbol. A receiving end detects a downlink control channel and acquires DCI related to transmission; determines a resource type of to-be-received data according to a resource allocation control field in the DCI; and detects the to-be-received data according to the DCI and the resource type of the to-be-received data. With the present disclosure, when resources multiplexed for the eMBB service and the URLLC service, frequency-domain resources allocated for URLLC transmission can be used by eMBB service data. Therefore, when the URLLC service is not frequently transmitted, system resource utilization is improved. In addition, when resources allocated for eMBB service data include frequency-domain resources for URLLC service transmission, eMBB service data is divided into two parts when transmitted over the allocated resources, where the two parts correspond to different redundancy versions; and the redundancy version 0 during the first transmission can be transmitted over frequency-domain resources which will not be occupied by URLLC, thereby preferentially ensuring the reliable transmission of the redundancy version 0 and improving the detection performance of eMBB.

Other aspects can be understood after the accompanying drawings and detailed description are read and understood.

BRIEF DESCRIPTION OF DRAWINGS

FIG. 1 is schematic diagram one illustrating multiplexing of the URLLC service and the eMBB service;

FIG. 2 is flowchart one of a data transmission method according to embodiments of the present disclosure;

FIG.

DETAILED DESCRIPTION

Figure 3:
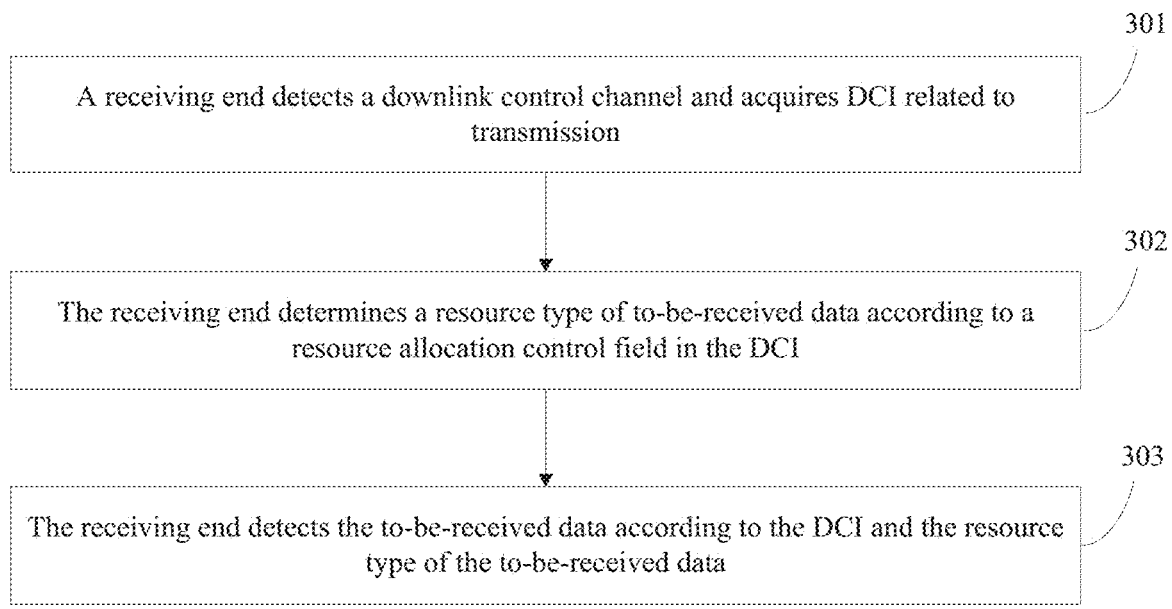
FIG. 3 is flowchart two of a data transmission method according to embodiments of the present disclosure.

Since the URLLC service requires a low transmission delay, the waiting time in a queue is short. For the downlink service, when the URLLC service arrives at the base station, the URLLC service is quickly sent out. Similarly, for the uplink service, the URLLC service is quickly sent out from the terminal. For the frequency division multiplexing used for the eMBB service and the URLLC service, one manner is to reserve sufficient resources for the URLLC service. However, since the URLLC service has a low transmission frequency and requires a high reliability, a large number of frequency resources are reserved in the case where the scheduling interval is short. Therefore, the manner of reserving resources brings great waste of resources, and is not a good scheme for the NR network to support the URLLC service.

When the base station transmits the downlink eMBB service, another efficient manner of supporting multiplexing of the URLLC service and the eMBB service is to allow puncturing for the URLLC service within the eMBB service being transmitted, as shown in FIG. 1. Since the eMBB service is punctured for the URLLC service, in the case where the eMBB terminal does not know which part of the data the terminal receives is covered by the URLLC data, the eMBB terminal decodes all the received data, and the performance is drastically lowered. Therefore, it is urgent to implement the multiplexing of the eMBB service and the URLLC service while ensuring the decoding performance of eMBB and satisfying the requirement of high reliability and low delay of ULRRC.

To provide a more detailed understanding of features and content of embodiments of the present disclosure, implementation of embodiments of the present disclosure is described below in detail with reference to the accompanying drawings. The accompanying drawings are provided for reference only and are not intended to limit embodiments of the present disclosure.

FIG. 2 is flowchart one of a data transmission method according to embodiments of the present disclosure. As shown in FIG. 2, the data transmission method includes the step described below.

In step 201, a transmitting end transmits data over an allocated resource; where the allocated resource includes one of: a first type of resource and a second type of resource, or the second type of resource; where a starting time of the second type of resource is later than a starting time of the first type of resource, or an ending time of the second type of resource is earlier than an ending time of the first type of resource, and the data transmitted over the first type of resource and the date transmitted over the second type of resource are aligned on a time-domain symbol.

In embodiments of the present disclosure, when the allocated resource includes the first type of resource and the second type of resource, the data is a first type of data; and when the allocated resource is the second type of resource, the data is a second type of data; where the first type of data and the second type of data have different key performance indicator (KPI) requirements. For example, when the first type of data is eMBB service data, the KPI is a peak rate; and when the second type of data is URLLC, the KPI is low delay and high reliability, such as a reliability of as high as 99.999% within one millisecond.

In an embodiment of the present disclosure, the method further includes that the transmitting end transmits a first redundancy version of the first type of data over the allocated first type of resource; and transmits a second redundancy version of the first type of data over the allocated second type of resource. The first redundancy version is different from the second redundancy version.

In an embodiment of the present disclosure, a version number of the first redundancy version is equal to 0 when the first type of data is transmitted for a first time.

In an embodiment of the present disclosure, downlink control information (DCI) for scheduling the first type of data is located in at least the first type of resource; and DCI for scheduling the second type of data is located in the second type of resource.

In an embodiment of the present disclosure, the transmitting end transmits the first type of data over the first type of resource and the second type of resource by using a same transmission mode. The transmission mode includes the number of transmission blocks, a multi-antenna transmission mode, and a reference signal structure.

In an embodiment of the present disclosure, the transmitting end transmits the first type of data over the first type of resource and the second type of resource by using a same modulation and coding scheme (MCS) or different MCSs.

In an embodiment of the present disclosure, when the transmitting end transmits the first type of data over the first type of resource and the second type of resource by using different MCSs, an MCS index used for the second type of resource is lower than an MCS index used for the first type of resource. In an embodiment of the present disclosure, when the transmitting end transmits the first type of data over the first type of resource and the second type of resource by using different MCSs, an MCS used for the first type of resource and an MCS used for the second type of resource are indicated by two different control fields in DCI for scheduling the first type of data, or the MCS used for the first type of resource is indicated by a control field in the DCI for scheduling the first type of data, and the MCS used for the second type of resource has a preset offset from the MCS used for the first type of resource.

In an embodiment of the present disclosure, a demodulation reference signal corresponding to the first type of data transmitted over the first type of resource is located on the first type of resource, and a time-domain symbol index of a demodulation reference signal corresponding to the first type of data transmitted over the second type of resource is the same as a time-domain symbol index of the demodulation reference signal transmitted over the first type of resource.

In an embodiment of the present disclosure, a relative frequency-domain position of the demodulation reference signal corresponding to the first type of data transmitted over the second type of resource is the same as a relative frequency-domain position of the demodulation reference signal transmitted over the first type of resource.

In an embodiment of the present disclosure, a demodulation reference signal corresponding to the second type of data is located on the second type of resource.

In an embodiment of the present disclosure, when the transmitting end transmits the second type of data over the second type of resource, assume-to-be-transmitted data of a demodulation reference signal of M antenna ports is transmitted at a same position as the first type of data transmitted over the second type of resource, where M is a positive integer.

In an embodiment of the present disclosure, M is pre-agreed by the transmitting end and a receiving end, notified by a high-layer signaling or indicated by a control field in the DCI for scheduling the second type of data.

In an embodiment of the present disclosure, the second type of resource includes a second type of resource A and a second type of resource B.

A first time-domain symbol of the second type of resource A is aligned with a first time-domain symbol of the first type of resource, and an ending time of the second type of resource A is earlier than an ending time of the first type of resource; and an ending time of the second type of resource B is the same as the ending time of the first type of resource.

In an embodiment of the present disclosure, the second type of resource A is a subset of the second type of resource B; or the second type of resource A is orthogonal to the second type of resource B in a time domain.

In an embodiment of the present disclosure, the number of time-domain symbols occupied by the second type of resource A is pre-agreed by the transmitting end and a receiving end or notified by a high-layer signaling; and when the number of time-domain symbols occupied by the second type of resource A is pre-agreed, the number of time-domain symbols occupied by the second type of resource A is the same as the number of time-domain symbols corresponding to an scheduling interval of the second type of data.

In an embodiment of the present disclosure, the transmitting end indicates, by using an allocation signaling for the second type of resource, a current resource type of the first type of data transmitted over the second type of resource, and the allocation signaling for the second type of resource is one control field in DCI for scheduling the first type of data.

In an embodiment of the present disclosure, when the second type of resource A is a subset of the second type of resource B, the allocation signaling for the second type of resource has a size of one bit, where a first state of the allocation signaling for the second type of resource indicates that current data is transmitted over the second type of resource A, and a second state of the allocation signaling for the second type of resource indicates that the current data is transmitted over the second type of resource B.

In an embodiment of the present disclosure, when the second type of resource A is orthogonal to the second type of resource B in the time domain, the allocation signaling for the second type of resource has a size of two bits, where a first state of the allocation signaling for the second type of resource indicates that the first type of data is transmitted over the second type of resource A, a second state of the allocation signaling for the second type of resource indicates that the first type of data is transmitted over the second type of resource B, and a third state of the allocation signaling for the second type of resource indicates that the first type of data is transmitted over the second type of resource A and the second type of resource B.

In an embodiment of the present disclosure, distribution of the first type of resource and the second type of resource in a system bandwidth is predefined by the transmitting end and a receiving end or configured by a high-layer signaling.

In embodiments of the present disclosure, a frequency-domain bandwidth for the first type of data is different from a frequency-domain bandwidth for the second type of data in the second type of resource.

FIG. 3 is flowchart two of a data transmission method according to embodiments of the present disclosure. As shown in FIG. 3, the data transmission method includes the steps described below.

In step 301, a receiving end detects a downlink control channel and acquires downlink control information (DCI) related to transmission.

In step 302, the receiving end determines a resource type of to-be-received data according to a resource allocation control field in the DCI.

In step 303, the receiving end detects the to-be-received data according to the DCI and the resource type of the to-be-received data.

In an embodiment of the present disclosure, the resource type includes a first type of resource and a second type of resource.

In an embodiment of the present disclosure, distribution of the first type of resource and the second type of resource in a system bandwidth is predefined by the transmitting end and a receiving end or configured by a high-layer signaling.

In an embodiment of the present disclosure, the second type of resource includes a second type of resource A and a second type of resource B.

A first time-domain symbol of the second type of resource A is aligned with a first time-domain symbol of the first type of resource, and an ending time of the second type of resource A is earlier than an ending time of the first type of resource; and an ending time of the second type of resource B is the same as the ending time of the first type of resource.

In an embodiment of the present disclosure, the second type of resource A is a subset of the second type of resource B; or the second type of resource A is orthogonal to the second type of resource B in a time domain.

In an embodiment of the present disclosure, the receiving end includes a receiving end for receiving the first type of data and a receiving end for receiving the second type of data, and the first type of data and the second type of data have different key performance indicator (KPI) requirements.

In an embodiment of the present disclosure, when the receiving end is a receiving end for receiving the first type of data, the receiving end determines, according to the resource allocation control field in the DCI, that the resource type of the to-be-received data includes one of: the first type of resource; or the first type of resource and the second type of resource.

In an embodiment of the present disclosure, when the receiving end determines that the resource type of the received data includes the first type of resource and the second type of resource, a terminal determines usage of the second type of resource according to a resource allocation control field for the second type of resource in the DCI.

In an embodiment of the present disclosure, when the receiving end determines that the resource type of the to-be-received data includes the first type of resource and the second type of resource, the receiving end performs detection according to different redundancy versions of the to-be-received data carried on the first type of resource and the second type of resource.

In an embodiment of the present disclosure, when the receiving end is the receiving end for receiving the second type of data, the receiving end receives over only the second type of resource.

In an embodiment of the present disclosure, the method further includes:

when T2−T1>T, providing, by a receiving end for receiving the second type of data, no feedback for hybrid automatic repeat request-acknowledgement (HARQ-ACK) of retransmitted data, where T1 is a first time at which the second type of data is received, T2 is another time at which the second type of data is received, and T is a parameter pre-agreed by a transmitting end and the receiving end or notified by a high-layer signaling.

In an embodiment of the present disclosure, when the receiving end for receiving the second type of data receives data over the second type of resource, assume-to-be-received data of a demodulation reference signal of M antenna ports is transmitted at a same position as the first type of data transmitted over the second type of resource, where M is a positive integer.

In an embodiment of the present disclosure, M is pre-agreed by the transmitting end and a receiving end, notified by a high-layer signaling or indicated by a control field in the DCI for scheduling the second type of data.

The data transmission method provided in embodiments of the present disclosure will be detailed below in connection with exemplary application scenarios.

Example One

Figure 4:
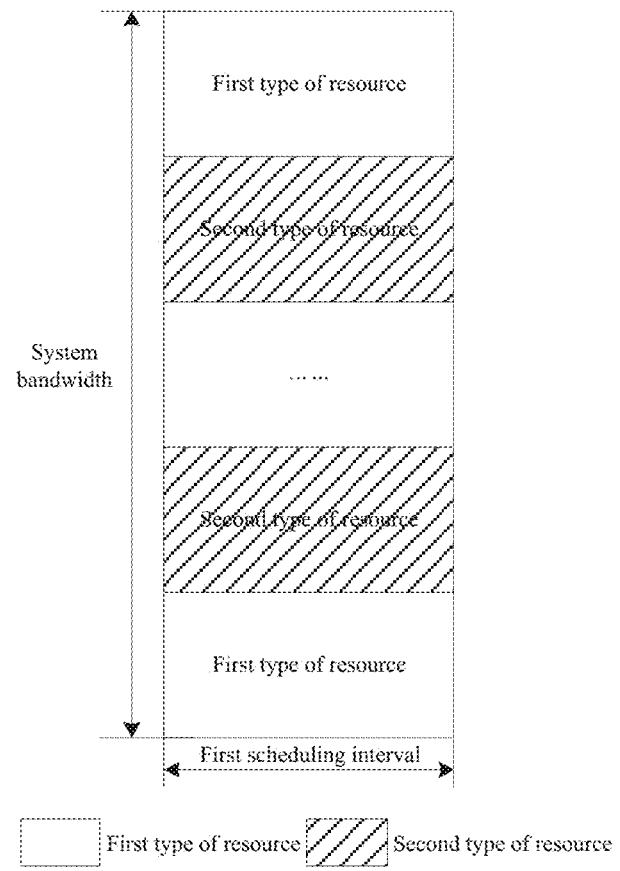
FIG. 4 is schematic diagram one of a resource structure according to embodiments of the present disclosure.

As shown in FIG. 4, it is assumed that in the time domain, the system resources use the scheduling interval of eMBB service data (the first type of data) as a unit and in the frequency domain, the system resources include the bandwidth occupied by the entire system. The system resources include a first type of resource and a second type of resource. The division into the first type of resource and the second type of resource may be pre-allocated by the network and agreed by the receiving end. Alternatively, the division into the first type resource and the second type resource in the system resources is notified by the network to the receiving end by using a high-layer signaling. FIG. 4 shows a schematic diagram of the division into the first type of resource and the second type of resource in the system resources.

The second type of resource is divided into a second type of resource A and a second type of resource B. The second type of resource A and the second type of resource B differ in occupied time-domain symbols.

The first time-domain symbol of the second type of resource A is aligned with the first time-domain symbol of the first type of resource. The ending time of the second type of resource A is earlier than the ending time of the first type of resource. The ending time of the second type of resource B is the same as the ending time of the first type of resource.

The second type of resource A is a subset of the second type of resource B; or the second type of resource A is orthogonal to the second type of resource B in a time domain. That is, the sum of the time-domain length of the second type of resource A and the time-domain length of the second type of resource B is equal to the time-domain length of the first type of resource.

Figure 5A:
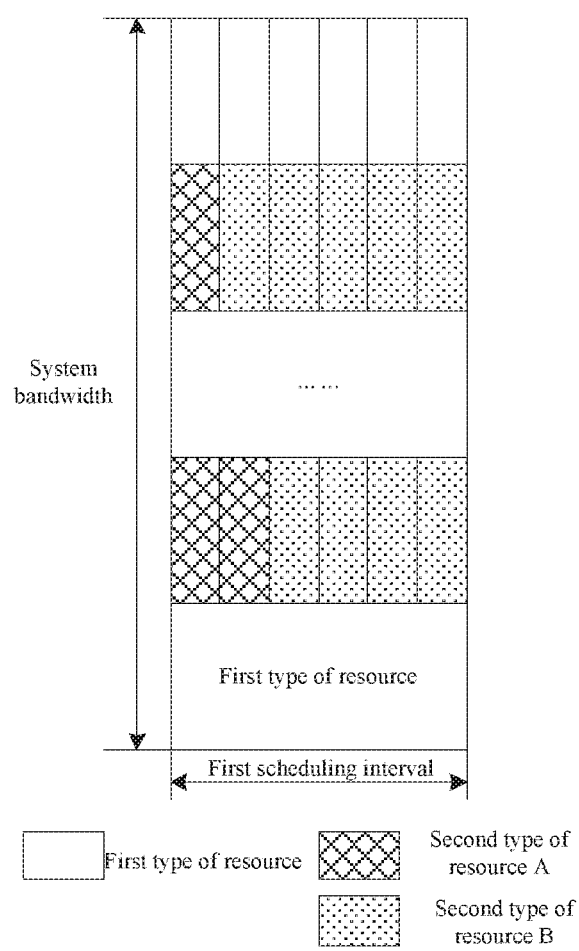
FIG. 5(a) and FIG. 5(b) are schematic diagram two of a resource structure according to embodiments of the present disclosure.

FIG. 5A shows a schematic diagram in which the second type of resource A is orthogonal to the second type of resource B in the time domain. It is assumed that the scheduling interval of the eMBB service, that is, a first scheduling interval, is seven time-domain symbols, the first time-domain symbol of the second type of resource A corresponds to the first time-domain symbol of the first type of resource, and among the second type of resource; the resource other than the second type of resource A is the second type of resource B.

Figure 5B:
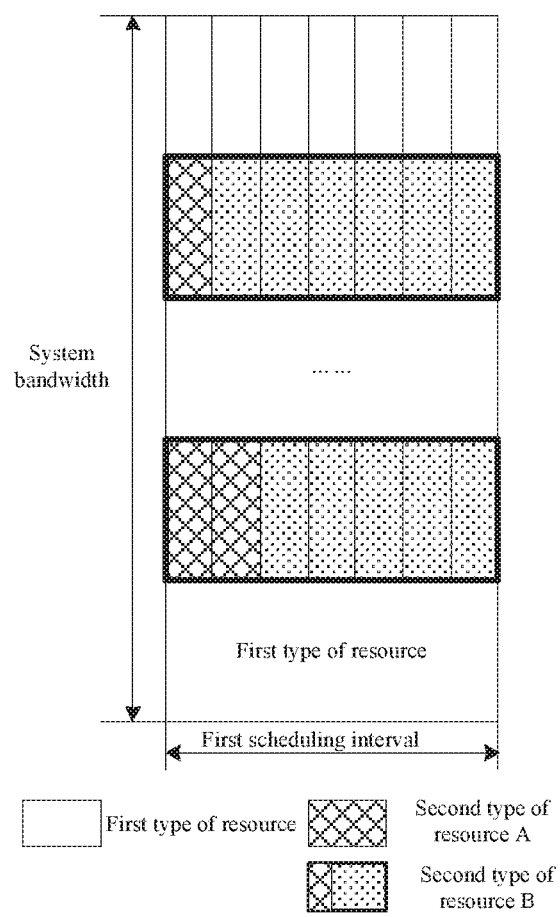

FIG. 5B shows a schematic diagram in which the second type of resource A is a subset of the second type of resource B. It is assumed that the scheduling interval of the eMBB service, that is, the first scheduling interval, is seven time-domain symbols, the first time-domain symbol of the second type of resource A corresponds to the first time-domain symbol of the first type of resource; the second type of resource B is a resource different from the frequency-domain resources which have the same scheduling interval of the eMBB service in the time domain, and the first type of resource A and the second type of resource B have the same frequency-domain resources.

In the (or each) second type of resource, the number of time-domain symbols occupied by the second type of resource A may be pre-configured by the network and agreed by the receiving end, or notified by the network to the receiving end by using a high-layer signaling. The number of time-domain symbols occupied by the second type of resource A may be the same as the number of time-domain symbols corresponding to the scheduling interval of URLLC service data.

eMBB service data transmitted over the first type of resource will not be replaced by URLLC service data (the second type of data); and eMBB service data transmitted over the second type of resource A will not be replaced by URLLC service data. The starting symbol of the second type of resource A is aligned with the starting symbol of the first type of resource. If the second type of resource A is allocated for eMBB service transmission, no URLLC service exists at the current moment. Therefore, the eMBB service transmitted over this part of resource is not replaced by URLLC. The eMBB service data transmitted over the second type of resource B may be replaced by URLLC service data. That is, eMBB service data can be transmitted over the entire system bandwidth. However, when transmitted over the second type of resource, the eMBB service data may be replaced by URLLC service data that requires a low delay. The second type of resource is reserved for URLLC service data by the system. When ULRRC service data exists, URLLC service data is transmitted over the second type of resource. Here, replacing certain data means not to transmit the data.

Example Two

On the basis of the system resource division described in example one, when the transmitting end transmits eMBB service data, the network may allocate the first type of resource for transmission or allocate the first type of resource and the second type of resource for transmission.

Figure 6:
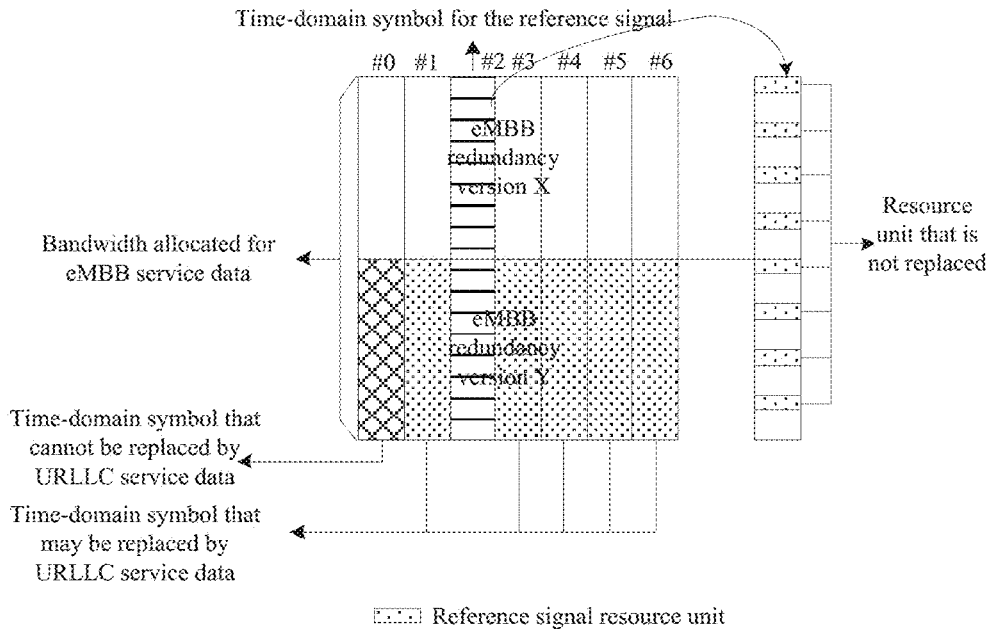
FIG. 6 is schematic diagram three of a resource structure according to embodiments of the present disclosure.

As shown in FIG. 6, when eMBB service data is transmitted over the first type of resource and the second type of resource, the transmitting end transmits the redundancy version X of the eMBB service data over the allocated first type of resource, the transmitting end transmits the redundancy version Y of the eMBB service data over the allocated second type of resource, and the redundancy version X and the redundancy version Y are different; when the eMBB service data is transmitted for the first time, the redundancy version X may be the redundancy version number 0, and the redundancy version Y may be one of the redundancy version numbers 1, 2 and 3. It is assumed here that the transport blocks corresponding to the eMBB service data have a total of four redundancy versions: redundancy version numbers 0, 1, 2 and 3.

Downlink control information (DCI) for scheduling the eMBB service data is located at least in the first type of resource.

When the transmitting end transmits eMBB service data over the first type of resource and the second type of resource, the transmitting end indicates, by using an allocation signaling for the second type of resource, the resource type used when the current data is transmitted over the second type of resource. The allocation signaling for the second type of resource is one control field in DCI for scheduling the eMBB service data.

When the second type of resource A is a subset of the second type of resource B, the allocation signaling for the second type of resource has a size of one bit. A first state ("0") of the signaling indicates that current data is transmitted over the second type of resource A, and a second state ("1") of the signaling indicates that the current data is transmitted over the second type of resource B.

When the second type of resource A is orthogonal to the second type of resource B in the time domain, the allocation signaling for the second type of resource has a size of two bits. A first state ("10") of the signaling indicates that the eMBB service data is transmitted over the second type of resource A, a second state ("01") of the signaling indicates that the eMBB service data is transmitted over the second type of resource B, and a third state ("11") of the signaling indicates that the eMBB service data is transmitted over the second type of resource A and the second type of resource B.

In an embodiment, when the second type of resource A is a subset of the second type of resource B, the allocation signaling for the second type of resource has a size of one bit. In this case, when the signaling is "0", the signaling indicates that the data is transmitted over the second type of resource A, and when the signaling is "1", the signaling indicates that the data is transmitted over the second type of resource B. In the schematic diagram shown in FIG. 6, assuming that the signaling is "1", then eMBB service data is transmitted over the second type of resource B.

The transmitting end transmits data over the first type of resource and the second type of resource by using a same transmission mode. The transmission mode includes the number of transmission blocks, a multi-antenna transmission mode, and a reference signal structure.

The transmitting end transmits the eMBB service data over the first type of resource and the second type of resource by using a same modulation and coding scheme (MCS) or different MCSs.

In the existing LTE system, the MCS used for the transmitted data is indicated by the MCS control field in the DCI. The MCS control field indicates an index in the MCS table. Each index in the MCS table corresponds to a modulation scheme and a transport block size (TBS). Through the MCS control field, the modulation mode used by the currently transmitted data and the transport block size of the currently transmitted data can be determined. In the MCS table, the smaller the MCS index is, the lower the modulation order is. The modulation order of QPSK is lower than that of 16-QAM, the modulation order of 16-QAM is lower than that of 64-QAM, and the modulation order 64-QAM is lower than that of 256-QAM. In the same modulation mode, the lower the MCS index, the smaller the corresponding transport block, and correspondingly, the lower the transmission code rate.

When the transmitting end transmits the eMBB service data over the first type of resource and the second type of resource by using different MCSs, an MCS index used for the second type of resource is lower than an MCS index used for the first type of resource. For example, when the modulation mode of 64-QAM is used on the first type of resource, the modulation mode of 16-QAM or QPSK is used on the second type resource; or when the same modulation mode is used, the code rate of data transmitted over the second type of resource is lower than the code rate of data transmitted over the first type of resource.

When the transmitting end transmits the eMBB service data over the first type of resource and the second type of resource by using different MCSs, the two different MCSs are indicated by two different control fields in DCI (the DCI includes two MCS control fields) for scheduling the eMBB service data; or, the MCS used for the first type of resource is indicated by a control field in DCI for scheduling the eMBB service data, and the MCS used for the second type of resource has a preset offset from the MCS used for the first type of resource. The offset is a negative value.

A demodulation reference signal corresponding to the eMBB service data transmitted over the first type of resource is located on the first type of resource. The time-domain symbol index of a demodulation reference signal corresponding to the eMBB service data transmitted over the second type of resource is the same as the time-domain symbol index of the demodulation reference signal transmitted over the first type of resource. The relative frequency-domain position (corresponding to the allocated minimum resource unit, which is the same below) of the demodulation reference signal corresponding to the eMBB service data transmitted over the second type of resource is the same as the relative frequency-domain position of the demodulation reference signal transmitted over the first type of resource.

In this embodiment, it is assumed that the reference signal is transmitted over the third symbol of the first scheduling interval, where the frequency-domain pattern of the reference signal is as shown by the right side of the figure. The pattern of the reference signal on the first type of resource is the same as the pattern of the reference signal on the second type of resource.

Example Three

When the transmitting end transmits URLLC service data, the network allocates the second type of resource for the transmission of the URLLC service data.

Downlink control information (DCI) for scheduling the URLLC service data is located on the second type of resource.

A demodulation reference signal corresponding to the URLLC service data is located on the second type of resource.

When the transmitting end transmits the URLLC service data over the second type of resource, assume-to-be-sent data of a demodulation reference signal of M antenna ports is transmitted at a same position as eMBB service data transmitted over the second type of resource. That is, the URLLC service data is not transmitted at the position where the demodulation reference signal of the M antenna ports may be transmitted. This transmission manner ensures that the demodulation reference signal of the eMBB service data that may be transmitted over the second type of resource is not replaced by the URLLC service data, so that the channel estimation of the eMBB service data is not affected by the URLLC service data.

M is pre-agreed by the transmitting end and the receiving end, notified by a high-layer signaling or indicated by a control field in DCI for scheduling the URLLC service data. The value of M may be {0, 1, 2, 3, . . . , 7, 8}.

FIG. 6 shows symbols that may be replaced by URLLC on the second type of resource. As shown in FIG. 6, the time-domain symbol #0 cannot be replaced by the URLLC service data. The symbol #0 is the second type of resource A. The case where the second type of resource A has already been scheduled for the eMBB service data indicates that no URLLC service data exists at the time aligned with the starting symbol of the second type of resource A. Therefore, when used for the eMBB service data, the second type of resource A is not replaced. A demodulation reference signal is located on the time-domain symbol #2. A resource unit where a reference signal is located cannot be replaced. This ensures the performance of the channel estimation of the eMBB service data. The time-domain symbols #1, #3, #4, #5 and #6 are allowed to be replaced by the URLLC service data.

Example Four

When eMBB service data is transmitted as described above, the eMBB receiving end first determines resources allocated for the eMBB service data according to a resource allocation signaling:

(1) When the allocated resources include only the first type of resource, the receiving end performs detection according to only one redundant version of the to-be-received data carried on the first type of resource.

(2) When the allocated resources include the first type of resource and the second type of resource, the receiving end determines the usage of the second type of resource according to the allocation signaling for the second type of resource and performs detection according to different redundancy versions of the to-be-received data carried on the first type of resource and the second type of resource.

Figure 7:
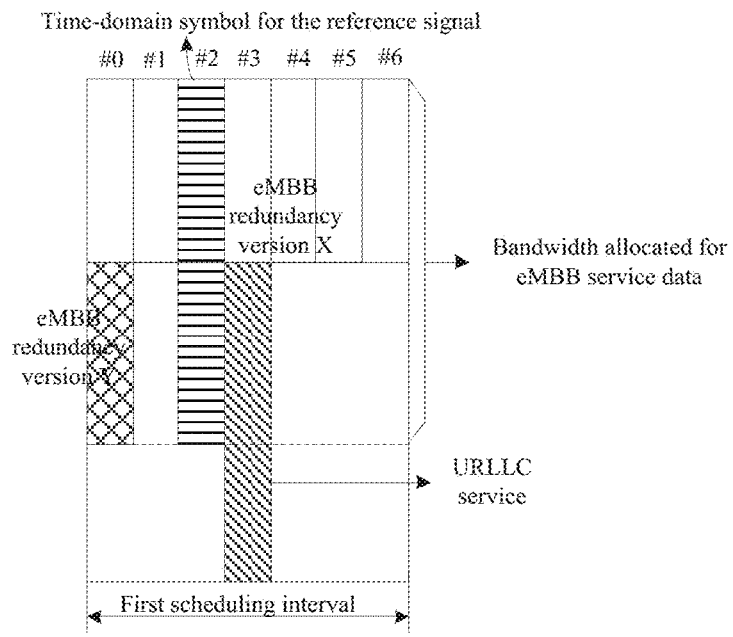
FIG. 7 is schematic diagram four of a resource structure according to embodiments of the present disclosure.

FIG. 7 shows a schematic diagram of resource allocation. Here it is assumed that the second type of resource A is orthogonal to the second type of resource B in the time domain. In this schematic diagram, the first type of resource and the second type of resource A are allocated for the transmission of the eMBB service data, and the transmitting end transmits the redundancy version X of the eMBB service data over the first type of resource and transmits the redundancy version Y of the eMBB service data over the second type resource A. If the second type of resource A is used for the eMBB service, no URLLC service exists at this time. If a ULRRC service needs to be transmitted later, the ULRRC service can be transmitted over the second type resource B. For example, if the URLLC service is transmitted over the symbol #3, the second type of resource A does not include a reference signal, and demodulation of data of the second type of resource A, and the channel estimation can be obtained by a reference signal on the symbol #2.

Figure 8:
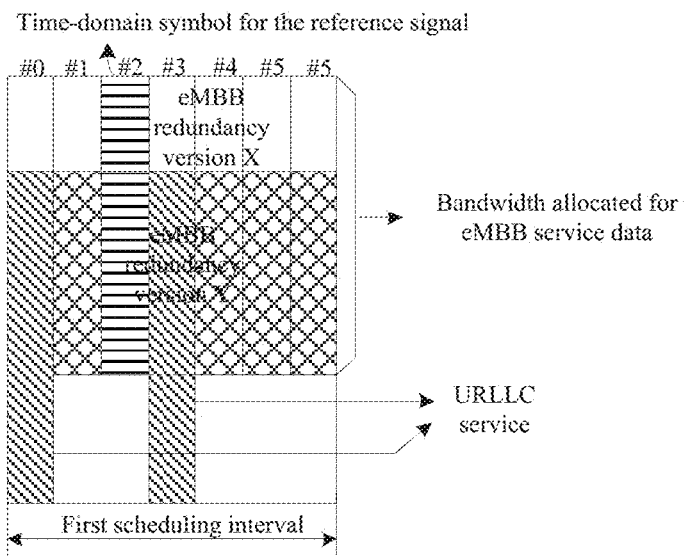
FIG. 8 is schematic diagram five of a resource structure according to embodiments of the present disclosure.

FIG. 8 shows a schematic diagram of another resource allocation. Here it is assumed that the second type of resource A is orthogonal to the second type of resource B in the time domain. In this schematic diagram, the first type of resource and the second type of resource B are allocated for the transmission of the eMBB service data, and the transmitting end transmits the redundancy version X of the eMBB service data over the first type of resource and transmits the redundancy version Y of the eMBB service data over the second type resource B. When the eMBB service is scheduled, the URLLC service needs to be transmitted. Thus, the second type of resource A will be used for URLLC transmission. The eMBB service can use only the second type of resource B if the eMBB service requires the second type of resource. The eMBB service data transmitted over the second type of resource B may be replaced if URLLC service data needs to be transmitted later. For example, if the URLLC service data is transmitted over the symbol #3, then the eMBB service data corresponding to the symbol #3 is replaced.

Example Five

When URLLC service data is transmitted as described above, the URLLC receiving end only receives on the second type of resource.

When T2−T1>T, the receiving end for receiving URLLC service data provides no feedback for HARQ-ACK of retransmitted data, where T1 is a first time at which URLLC service data is received, T2 is another time at which URLLC service data is received, T is a parameter pre-agreed by the transmitting end and the receiving end or notified by a high-layer signaling, and T may be 0.5 millisecond milliseconds or 0.75 milliseconds. URLLC service data requires a low delay, so when the number of retransmissions exceeds the requirement of low delay, the receiving end does not perform HARQ-ACK feedback for the retransmitted data even if the receiving end receives the retransmitted data. In other words, after a certain period of time, the receiving end is not expected to receive retransmitted URLLC service data.

When the receiving end for receiving URLLC service data receives data over the second type of resource, assume-to-be-received data of a demodulation reference signal of M antenna ports is transmitted at a same position as eMBB service data transmitted over the second type of resource, where M is a positive integer. That is, the receiving end does not receive data at the position where the demodulation reference signal of the M antenna ports may be transmitted.

M is pre-agreed by the transmitting end and the receiving end, notified by a high-layer signaling or indicated by a control field in DCI for scheduling the URLLC service data. The value of M may be {0, 1, 2, 3, . . . , 7, 8}.

As can be seen from example four and example five, the eMBB service and the URLLC service transmitted over the second type of resource may differ in bandwidth occupied in the frequency domain.

Figure 9:
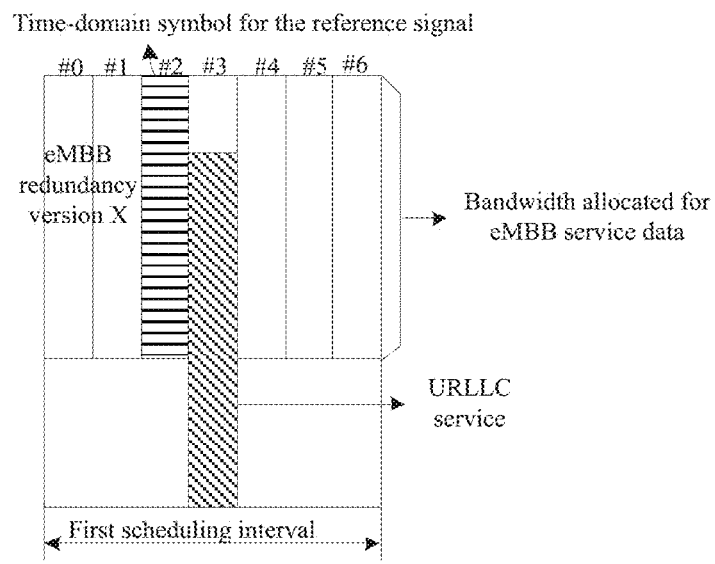
FIG. 9 is schematic diagram six of a resource structure according to embodiments of the present disclosure.

With the transmission methods provided in embodiments of the present disclosure, frequency-domain resources allocated for URLLC transmission can be used by eMBB service data; therefore, when the URLLC service is not frequently transmitted, system resource utilization is improved. In addition, when resources allocated for eMBB service data include frequency-domain resources for URLLC service transmission, the eMBB service data is divided into two parts when transmitted over the allocated resources, where the two parts correspond to different redundancy versions; and the redundancy version 0 during the first transmission can be transmitted over frequency-domain resources not occupied by URLLC, thereby preferentially ensuring the reliable transmission of the redundancy version 0. Compared with a traditional transmission mode as shown in FIG. 9 in which eMBB is not distinguished from others on the allocated resources and may be replaced by URLLC, and a certain redundancy version is directly transmitted, the detection performance of eMBB is improved.

Figure 10:
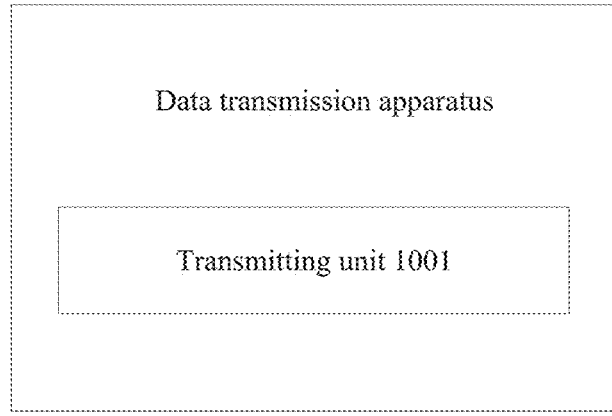
FIG. 10 is structure diagram one of a data transmission apparatus according to embodiments of the present disclosure.

FIG. 10 is structure diagram one of a data transmission apparatus according to embodiments of the present disclosure. As shown in FIG. 10, the apparatus includes a transmitting unit 1001.

The transmitting unit 1001 is configured to transmit data over an allocated resource. The allocated resource includes one of: a first type of resource and a second type of resource; or the second type of resource. A starting time of the second type of resource is later than a starting time of the first type of resource or an ending time of the second type of resource is earlier than an ending time of the first type of resource, the data transmitted over the first type of resource and the data transmitted over the second type of resource are aligned on a time-domain symbol, and the resource is composed of a time-domain symbol and a frequency-domain resource block.

In an embodiment of the present disclosure, when the allocated resource includes the first type of resource and the second type of resource, the data is a first type of data; and when the allocated resource is the second type of resource, the data is a second type of data; where the first type of data and the second type of data have different key performance indicator (KPI) requirements.

In an embodiment of the present disclosure, the transmitting unit 1001 is further configured to transmit a first redundancy version of the first type of data over the allocated first type of resource; and to transmit a second redundancy version of the first type of data over the allocated second type of resource. The first redundancy version is different from the second redundancy version.

In an embodiment of the present disclosure, a version number of the first redundancy version is equal to 0 when the first type of data is transmitted for a first time.

In an embodiment of the present disclosure, downlink control information (DCI) for scheduling the first type of data is located in at least the first type of resource; and DCI for scheduling the second type of data is located in the second type of resource.

In an embodiment of the present disclosure, the transmitting end transmits the first type of data over the first type of resource and the second type of resource by using a same transmission mode. The transmission mode includes the number of transmission blocks, a multi-antenna transmission mode, and a reference signal structure.

In embodiments of the present disclosure, the transmitting end transmits the first type of data over the first type of resource and the second type of resource by using a same modulation and coding scheme (MCS) or different MCSs.

In an embodiment of the present disclosure, when the transmitting end transmits the first type of data over the first type of resource and the second type of resource by using different MCSs, an MCS index used for the second type of resource is lower than an MCS index used for the first type of resource.

In an embodiment of the present disclosure, when the transmitting end transmits the first type of data over the first type of resource and the second type of resource by using different MCSs, an MCS used for the first type of resource and an MCS used for the second type of resource are indicated by two different control fields in DCI for scheduling the first type of data, or the MCS used for the first type of resource is indicated by a control field in the DCI for scheduling the first type of data, and the MCS used for the second type of resource has a preset offset from the MCS used for the first type of resource.

In an embodiment of the present disclosure, a demodulation reference signal corresponding to the first type of data transmitted over the first type of resource is located on the first type of resource, and a time-domain symbol index of a demodulation reference signal corresponding to the first type of data transmitted over the second type of resource is the same as a time-domain symbol index of the demodulation reference signal transmitted over the first type of resource.

In an embodiment of the present disclosure, a relative frequency-domain position of the demodulation reference signal corresponding to the first type of data transmitted over the second type of resource is the same as a relative frequency-domain position of the demodulation reference signal transmitted over the first type of resource.

In an embodiment of the present disclosure, a demodulation reference signal corresponding to the second type of data is located on the second type of resource.

In an embodiment of the present disclosure, when the transmitting end transmits the second type of data over the second type of resource, assume-to-be-transmitted data of a demodulation reference signal of M antenna ports is transmitted at a same position as the first type of data transmitted over the second type of resource, where M is a positive integer.

In an embodiment of the present disclosure, M is pre-agreed by the transmitting end and a receiving end, notified by a high-layer signaling or indicated by a control field in the DCI for scheduling the second type of data.

In embodiments of the present disclosure, the second type of resource includes a second type of resource A and a second type of resource B.

A first time-domain symbol of the second type of resource A is aligned with a first time-domain symbol of the first type of resource, and an ending time of the second type of resource A is earlier than an ending time of the first type of resource; and an ending time of the second type of resource B is the same as the ending time of the first type of resource.

In an embodiment of the present disclosure, the second type of resource A is a subset of the second type of resource B; or the second type of resource A is orthogonal to the second type of resource B in a time domain.

In an embodiment of the present disclosure, the number of time-domain symbols occupied by the second type of resource A is pre-agreed by the transmitting end and a receiving end or notified by a high-layer signaling; and when the number of time-domain symbols occupied by the second type of resource A is pre-agreed, the number of time-domain symbols occupied by the second type of resource A is the same as the number of time-domain symbols corresponding to an scheduling interval of the second type of data.

In an embodiment of the present disclosure, the transmitting end indicates, by using an allocation signaling for the second type of resource, a current resource type of the first type of data transmitted over the second type of resource, and the allocation signaling for the second type of resource is one control field in DCI for scheduling the first type of data.

In an embodiment of the present disclosure, when the second type of resource A is a subset of the second type of resource B, the allocation signaling for the second type of resource has a size of one bit, where a first state of the allocation signaling for the second type of resource indicates that current data is transmitted over the second type of resource A, and a second state of the allocation signaling for the second type of resource indicates that the current data is transmitted over the second type of resource B.

In an embodiment of the present disclosure, when the second type of resource A is orthogonal to the second type of resource B in the time domain, the allocation signaling for the second type of resource has a size of two bits, where a first state of the allocation signaling for the second type of resource indicates that the first type of data is transmitted over the second type of resource A, a second state of the allocation signaling for the second type of resource indicates that the first type of data is transmitted over the second type of resource B, and a third state of the allocation signaling for the second type of resource indicates that the first type of data is transmitted over the second type of resource A and the second type of resource B.

In an embodiment of the present disclosure, distribution of the first type of resource and the second type of resource in a system bandwidth is predefined by the transmitting end and a receiving end or configured by a high-layer signaling.

In an embodiment of the present disclosure, a frequency-domain bandwidth for the first type of data is different from a frequency-domain bandwidth for the second type of data in the second type of resource.

It is to be understood by those skilled in the art that implementation of the functions of various units in the data transmission apparatus shown in FIG. 10 may be understood with reference to the description of the preceding data transmission method. The functions of various modules in the data transmission apparatus shown in FIG. 10 may be implemented by one or more programs running on a processor or by one or more logic circuits.

Figure 11:
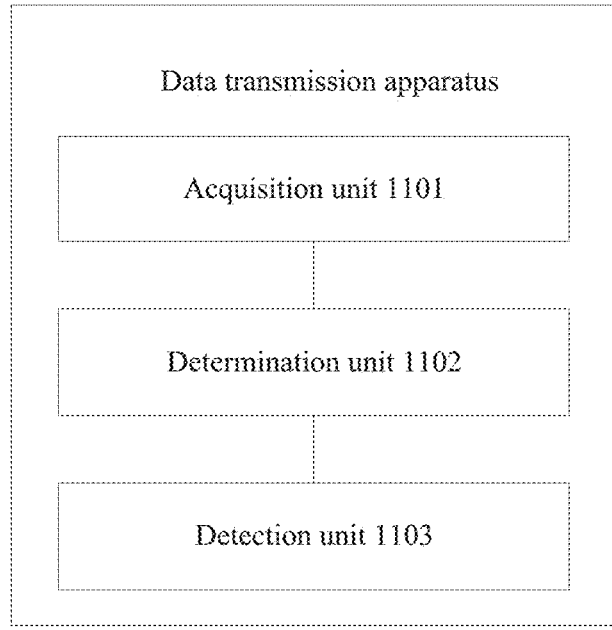
FIG. 11 is structure diagram two of a data transmission apparatus according to embodiments of the present disclosure.

FIG. 11 is structure diagram two of a data transmission apparatus according to embodiments of the present disclosure. As shown in FIG. 11, the apparatus includes an acquisition unit 1101, a determination unit 1102 and a detection unit 1102.

The acquisition unit 1101 is configured to detect a downlink control channel and acquire downlink control information (DCI) related to transmission;

The determination unit 1102 is configured to determine a resource type of to-be-received data according to a resource allocation control field in the DCI; and The detection unit 1103 is configured to detect the to-be-received data according to the DCI and the resource type of the to-be-received data.

In an embodiment of the present disclosure, the resource type includes a first type of resource and a second type of resource.

In an embodiment of the present disclosure, distribution of the first type of resource and the second type of resource in a system bandwidth is predefined by the transmitting end and a receiving end or configured by a high-layer signaling.

In an embodiment of the present disclosure, the second type of resource includes a second type of resource A and a second type of resource B.

A first time-domain symbol of the second type of resource A is aligned with a first time-domain symbol of the first type of resource, and an ending time of the second type of resource A is earlier than an ending time of the first type of resource; and an ending time of the second type of resource B is the same as the ending time of the first type of resource.

In an embodiment of the present disclosure, the second type of resource A is a subset of the second type of resource B; or the second type of resource A is orthogonal to the second type of resource B in a time domain.

In an embodiment of the present disclosure, the receiving end includes a receiving end for receiving the first type of data and a receiving end for receiving the second type of data, and the first type of data and the second type of data have different key performance indicator (KPI) requirements.

In an embodiment of the present disclosure, when the receiving end is a receiving end for receiving the first type of data, the receiving end determines, according to the resource allocation control field in the DCI, that the resource type of the to-be-received data includes one of: the first type of resource; or the first type of resource and the second type of resource.

In an embodiment of the present disclosure, when the receiving end determines that the resource type of the received data includes the first type of resource and the second type of resource, a terminal determines usage of the second type of resource according to a resource allocation control field for the second type of resource in the DCI.

In an embodiment of the present disclosure, when the receiving end determines that the resource type of the to-be-received data includes the first type of resource and the second type of resource, the receiving end performs detection according to different redundancy versions of the to-be-received data carried on the first type of resource and the second type of resource.

In an embodiment of the present disclosure, when the receiving end is the receiving end for receiving the second type of data, the receiving end receives over only the second type of resource.

In an embodiment of the present disclosure, when T2−T1>T, a receiving end for receiving the second type of data provides no feedback for hybrid automatic repeat request-acknowledgement (HARQ-ACK) of retransmitted data, where T1 is a first time at which the second type of data is received, T2 is another time at which the second type of data is received, and T is a parameter pre-agreed by a transmitting end and the receiving end or notified by a high-layer signaling.

In an embodiment of the present disclosure, when the receiving end for receiving the second type of data receives data over the second type of resource, assume-to-be-received data of a demodulation reference signal of M antenna ports is transmitted at a same position as the first type of data transmitted over the second type of resource, where M is a positive integer.

In an embodiment of the present disclosure, M is pre-agreed by the transmitting end and a receiving end, notified by a high-layer signaling or indicated by a control field in the DCI for scheduling the second type of data.

It is to be understood by those skilled in the art that implementation of the functions of various units in the data transmission apparatus shown in FIG. 11 may be understood with reference to the description of the preceding data transmission method. The functions of various modules in the data transmission apparatus shown in FIG. 11 may be implemented by one or more programs running on a processor or by one or more logic circuits.

Figure 12:
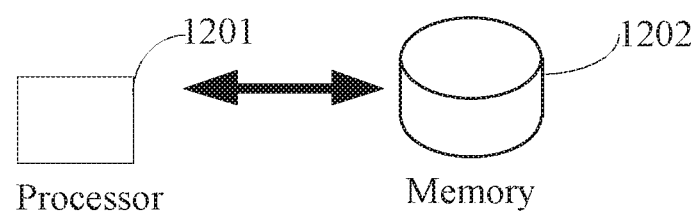
FIG. 12 is a structure diagram of an electronic device according to embodiments of the present disclosure.

FIG. 12 is a structure diagram of an electronic device according to embodiments of the present disclosure. As shown in FIG. 12, the electronic device includes a processor 1201; and a memory 1202 storing instructions executable by the processor 1201. When the instructions are executed by the processor 1201, In a first implementation, the processor 1201 performs the following step: transmitting data over an allocated resource. The allocated resource includes one of: a first type of resource and a second type of resource; or the second type of resource. A starting time of the second type of resource is later than a starting time of the first type of resource, or an ending time of the second type of resource is earlier than an ending time of the first type of resource, and the data transmitted over the first type of resource and the date transmitted over the second type of resource are aligned on a time-domain symbol.

In a second implementation, the processor 1201 performs the following steps: detecting a downlink control channel and acquiring DCI related to transmission; determining a resource type of to-be-received data according to a resource allocation control field in the DCI; and detecting the to-be-received data according to the DCI and the resource type of the to-be-received data.

It is to be understood by those skilled in the art that the electronic device shown in FIG. 12 is capable of performing the steps of the data transmission method in any embodiment of the present disclosure.

Embodiments of the present disclosure further provide a computer-readable storage medium configured to store computer-executable instructions for executing any method described above when the instructions are executed by a processor.

It is to be understood by those of ordinary skill in the art that all or some of the steps and systems in the methods disclosed herein and all or some of the function modules/units in the apparatuses disclosed herein may be implemented as software, firmware, hardware or a suitable combination thereof. In a hardware implementation, the division into the function modules/units described above does not necessarily correspond to the division into physical components. For example, one physical component may have multiple functions, or one function or step may be implemented by several physical components cooperatively. Some or all of the components may be implemented as software executed by a processor, such as a digital signal processor or a microprocessor, or may be implemented as hardware, or may be implemented as an integrated circuit, such as an application-specific integrated circuit. Such software may be distributed over computer-readable media. The computer-readable media may include computer storage media (or non-transitory media) and communication media (or transitory media). As is known to those of ordinary skill in the art, the term computer storage media include volatile and non-volatile as well as removable and non-removable media implemented in any method or technology for storing information (such as computer-readable instructions, data structures, program modules or other data). The computer storage media include, but are not limited to, RAM, ROM, EEPROM, flash memory or other memory technologies, CD-ROM, digital versatile disc (DVD) or other optical disc storage, magnetic cartridge, magnetic tape, magnetic disk storage or other magnetic storage devices, or any other medium used for storing the desired information and accessible by a computer. Moreover, it is known to those skilled in the art that communication media typically include computer-readable instructions, data structures, program modules or other data in a modulated data signal, such as a carrier wave or other transport mechanisms, and may include any information delivery medium.

The above are only exemplary embodiments of the present disclosure and are not intended to limit the scope of the present disclosure.

INDUSTRIAL APPLICABILITY

In in embodiments of the present disclosure, a transmitting end transmits data over an allocated resource. The allocated resource includes one of: a first type of resource and a second type of resource; or the second type of resource. A starting time of the second type of resource is later than a starting time of the first type of resource, or an ending time of the second type of resource is earlier than an ending time of the first type of resource, and the data transmitted over the first type of resource and the date transmitted over the second type of resource are aligned on a time-domain symbol. A receiving end detects a downlink control channel and acquires DCI related to transmission; determines a resource type of to-be-received data according to a resource allocation control field in the DCI; and detects the to-be-received data according to the DCI and the resource type of the to-be-received data. With the present disclosure, when resources multiplexed for the eMBB service and the URLLC service, frequency-domain resources allocated for URLLC transmission can be used by eMBB service data. Therefore, when the URLLC service is not frequently transmitted, system resource utilization is improved. In addition, when resources allocated for eMBB service data include frequency-domain resources for URLLC service transmission, eMBB service data is divided into two parts when transmitted over the allocated resources, where the two parts correspond to different redundancy versions; and the redundancy version 0 during the first transmission can be transmitted over frequency-domain resources which will not be occupied by URLLC, thereby preferentially ensuring the reliable transmission of the redundancy version 0 and improving the detection performance of eMBB. Therefore, the present disclosure has industrial applicability.

What is claimed is:

1. A data transmission method, comprising:
   transmitting, by a transmitting end, data over an allocated resource,
   wherein the allocated resource comprises one of:
   a first type of resource and a second type of resource; or
   the second type of resource,
   wherein a starting time of the second type of resource is later than a starting time of the first type of resource, or an ending time of the second type of resource is earlier than an ending time of the first type of resource, and the data transmitted over the first type of resource and the data transmitted over the second type of resource are aligned on a time-domain symbol,
   wherein when the allocated resource comprises the first type of resource and the second type of resource, the data is a first type of data; and when the allocated resource is the second type of resource, the data is a second type of data;
   wherein the first type of data and the second type of data have different key performance indicator (KPI) requirements;
   wherein the method further comprises:
   transmitting, by the transmitting end, a first redundancy version of the first type of data over the allocated first type of resource; and
   transmitting, by the transmitting end, a second redundancy version of the first type of data over the allocated second type of resource,
   wherein the first redundancy version is different from the second redundancy version,
   wherein a version number of the first redundancy version is equal to 0 when the first type of data is transmitted for a first time.

2. The data transmission method of claim 1, wherein downlink control information (DCI) for scheduling the first type of data is located in at least the first type of resource; and DCI for scheduling the second type of data is located in the second type of resource.

3. The data transmission method of claim 1, wherein the transmitting end transmits the first type of data over the first type of resource and the second type of resource by using a same transmission mode.

4. The data transmission method of claim 1, wherein the transmitting end transmits the first type of data over the first type of resource and the second type of resource by using a same modulation and coding scheme (MCS) or different MCSs,
wherein when the transmitting end transmits the first type of data over the first type of resource and the second type of resource by using different MCSs, an MCS index used for the second type of resource is lower than an MCS index used for the first type of resource; and
an MCS used for the first type of resource and an MCS used for the second type of resource are indicated by two different control fields in DCI for scheduling the first type of data, or
the MCS used for the first type of resource is indicated by a control field in the DCI for scheduling the first type of data, and the MCS used for the second type of resource has a preset offset from the MCS used for the first type of resource.

5. The data transmission method of claim 1, wherein a demodulation reference signal corresponding to the first type of data transmitted over the first type of resource is located on the first type of resource, and a time-domain symbol index of a demodulation reference signal corresponding to the first type of data transmitted over the second type of resource is the same as a time-domain symbol index of the demodulation reference signal transmitted over the first type of resource,
wherein a relative frequency-domain position of the demodulation reference signal corresponding to the first type of data transmitted over the second type of resource is the same as a relative frequency-domain position of the demodulation reference signal transmitted over the first type of resource.

6. The data transmission method of claim 1, wherein a demodulation reference signal corresponding to the second type of data is located on the second type of resource,
wherein when the transmitting end transmits the second type of data over the second type of resource, assume-to-be-transmitted data of a demodulation reference signal of M antenna ports is transmitted at a same position as the first type of data transmitted over the second type of resource, wherein M is a positive integer,
wherein M is pre-agreed by the transmitting end and a receiving end, notified by a high-layer signaling or indicated by a control field in the DCI for scheduling the second type of data.

7. The data transmission method of claim 6, wherein the second type of resource comprises a second type of resource A and a second type of resource B,
a first time-domain symbol of the second type of resource A is aligned with a first time-domain symbol of the first type of resource, and an ending time of the second type of resource A is earlier than an ending time of the first type of resource; and an ending time of the second type of resource B is the same as the ending time of the first type of resource,
wherein the second type of resource A is a subset of the second type of resource B; or the second type of resource A is orthogonal to the second type of resource B in a time domain,
wherein a number of time-domain symbols occupied by the second type of resource A is pre-agreed by the transmitting end and a receiving end or notified by a high-layer signaling; and
when the number of time-domain symbols occupied by the second type of resource A is pre-agreed, the number of time-domain symbols occupied by the second type of resource A is the same as a number of time-domain symbols corresponding to an scheduling interval of the second type of data.

8. The data transmission method of claim 7, wherein the transmitting end indicates, by using an allocation signaling for the second type of resource, a current resource type of the first type of data transmitted over the second type of resource, and the allocation signaling for the second type of resource is one control field in DCI for scheduling the first type of data,
wherein when the second type of resource A is a subset of the second type of resource B, the allocation signaling for the second type of resource has a size of one bit, wherein a first state of the allocation signaling for the second type of resource indicates that current data is transmitted over the second type of resource A, and a second state of the allocation signaling for the second type of resource indicates that the current data is transmitted over the second type of resource B,
wherein when the second type of resource A is orthogonal to the second type of resource B in the time domain, the allocation signaling for the second type of resource has a size of two bits, wherein a first state of the allocation signaling for the second type of resource indicates that the first type of data is transmitted over the second type of resource A, a second state of the allocation signaling for the second type of resource indicates that the first type of data is transmitted over the second type of resource B, and a third state of the allocation signaling for the second type of resource indicates that the first type of data is transmitted over the second type of resource A and the second type of resource B.

9. The data transmission method of claim 1, wherein distribution of the first type of resource and the second type of resource in a system bandwidth is predefined by the transmitting end and a receiving end or configured by a high-layer signaling,
wherein a frequency-domain bandwidth for the first type of data is different from a frequency-domain bandwidth for the second type of data in the second type of resource.

10. A data transmission method, comprising:
detecting, by a receiving end, a downlink control channel and acquiring downlink control information (DCI) related to transmission;
determining a resource type of to-be-received data according to a resource allocation control field in the DCI; and
detecting the to-be-received data according to the DCI and the resource type of the to-be-received data;
wherein the resource type comprises a first type of resource and a second type of resource,
wherein distribution of the first type of resource and the second type of resource in a system bandwidth is predefined by a transmitting end and the receiving end or configured by a high-layer signaling;
wherein the receiving end comprises a receiving end for receiving the first type of data and a receiving end for receiving the second type of data, and the first type of data and the second type of data have different key performance indicator (KPI) requirements, wherein when the receiving end is a receiving end for receiving the first type of data, the receiving end determines, according to the resource allocation control field in the DCI, that the resource type of the to-be-received data comprises one of:

the first type of resource; or the first type of resource and the second type of resource, wherein when the receiving end determines that the resource type of the received data comprises the first type of resource and the second type of resource, the receiving end determines usage of the second type of resource according to a resource allocation control field for the second type of resource in the DCI, or the receiving end performs detection according to different redundancy versions of the to-be-received data carried on the first type of resource and the second type of resource, wherein when the receiving end is the receiving end for receiving the second type of data, the receiving end receives over only the second type of resource, wherein assume-to-be-received data of a demodulation reference signal of M antenna ports is transmitted at a same position as the first type of data transmitted over the second type of resource, wherein M is a positive integer, wherein M is pre-agreed by a transmitting end and the receiving end, notified by a high-layer signaling or indicated by a control field comprised in DCI for scheduling the second type of data.

11. The data transmission method of claim 10, wherein the second type of resource comprises a second type of resource A and a second type of resource B, a first time-domain symbol of the second type of resource A is aligned with a first time-domain symbol of the first type of resource, and an ending time of the second type of resource A is earlier than an ending time of the first type of resource; and an ending time of the second type of resource B is the same as the ending time of the first type of resource, wherein the second type of resource A is a subset of the second type of resource B; or the second type of resource A is orthogonal to the second type of resource B in a time domain.

12. The data transmission method of claim 10, further comprising:

when T2−T1>T, deciding, by a receiving end for receiving the second type of data, not to provide feedback for hybrid automatic repeat request-acknowledgement (HARQ-ACK) of retransmitted data, wherein T1 is a first time at which the second type of data is received, T2 is another time at which the second type of data is received, and T is a parameter pre-agreed by a transmitting end and the receiving end or notified by a high-layer signaling.

13. A data transmission apparatus, applied to a transmitting end, comprising:

a transmitter, which is configured to execute steps of the data transmission method of claim 1.

14. A data transmission apparatus, applied to a receiving end, comprising:

a processor; and a memory storing instructions executable by the processor, wherein when the instructions are executed by the processor, the processor executes steps of the data transmission method of claim 10.

15. An electronic device, comprising:

a processor; and a memory storing instructions executable by the processor, wherein when the instructions are executed by the processor, the processor executes steps of the data transmission method of claim 1.

16. An electronic device, comprising:

a processor; and a memory storing instructions executable by the processor, wherein when the instructions are executed by the processor, the processor executes steps of the data transmission method of claim 10.

17. A data transmission method, comprising:

transmitting, by a transmitting end, data over an allocated resource, wherein the allocated resource comprises one of:

a first type of resource and a second type of resource; or the second type of resource, wherein the data transmitted over the first type of resource and the data transmitted over the second type of resource are aligned on a time-domain symbol, wherein when the allocated resource comprises the first type of resource and the second type of resource, the data is a first type of data; and when the allocated resource is the second type of resource, the data is a second type of data;

wherein the method further comprises:

transmitting, by the transmitting end, a first redundancy version of the first type of data over the allocated first type of resource; and transmitting, by the transmitting end, a second redundancy version of the first type of data over the allocated second type of resource, wherein the first redundancy version is different from the second redundancy version.

18. The data transmission method of claim 17, wherein a starting time of the second type of resource is later than a starting time of the first type of resource, or an ending time of the second type of resource is earlier than an ending time of the first type of resource.

* * * * *

UNITED STATES PATENT AND TRADEMARK OFFICE
CERTIFICATE OF CORRECTION

PATENT NO. : 11,039,459 B2  
APPLICATION NO. : 16/347505  
DATED : June 15, 2021  
INVENTOR(S) : Shuqiang Xia Page 1 of 2

It is certified that error appears in the above-identified patent and that said Letters Patent is hereby corrected as shown below:

On the Title Page

In Column 2, item (57), Abstract, Line 10, delete "date" and insert --data--.

In the Drawings

In sheet 1 of 8, FIG. 2, reference numeral 201, Line 6, delete "date" and insert --data--.

In the Specification

In Column 1, Line 10, delete "2016/10958372.4" and insert --201610958372.4--.

In Column 2, Line 6, delete "date" and insert --data--.

In Column 8, Line 29, delete "date" and insert --data--.

In Column 8, Line 65, delete "FIG. FIG. 5(a) and FIG. 5(b)" and insert --FIG. 5A and FIG. 5B--.

In Column 9, Line 48, delete "ULRRC." and insert --URLLC.--.

In Column 10, Line 1, delete "date" and insert --data--.

In Column 14, Line 45, delete "ULRRC" and insert --URLLC--.

In Column 17, Line 50, delete "ULRRC" and insert --URLLC--.

In Column 17, Line 51, delete "ULRRC" and insert --URLLC--.

In Column 22, Line 59, delete "1201," and insert --1201.--.

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 11,039,459 B2

In Column 23, Line 1, delete "date" and insert --data--.

In Column 23, Line 63, delete "In in" and insert --In--.

In Column 24, Line 4, delete "date" and insert --data--.